(12) United States Patent
Sakai et al.

(10) Patent No.: US 11,988,276 B2
(45) Date of Patent: May 21, 2024

(54) ROTARY TABLE

(71) Applicant: NIPPON THOMPSON CO., LTD., Tokyo (JP)

(72) Inventors: Tetsuya Sakai, Toki (JP); Kousuke Tobari, Toki (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 82 days.

(21) Appl. No.: 17/758,831

(22) PCT Filed: Dec. 10, 2020

(86) PCT No.: PCT/JP2020/046102
§ 371 (c)(1),
(2) Date: Jul. 14, 2022

(87) PCT Pub. No.: WO2021/145111
PCT Pub. Date: Jul. 22, 2021

(65) Prior Publication Data
US 2023/0044626 A1 Feb. 9, 2023

(30) Foreign Application Priority Data

Jan. 17, 2020 (JP) ................................ 2020-005902

(51) Int. Cl.
*F16H 57/04* (2010.01)
*B23Q 1/25* (2006.01)
*F16H 19/08* (2006.01)
*F16H 57/021* (2012.01)
*F16H 57/039* (2012.01)
(Continued)

(52) U.S. Cl.
CPC ............... *F16H 57/12* (2013.01); *B23Q 1/25* (2013.01); *F16H 19/08* (2013.01); *F16H 57/021* (2013.01);
(Continued)

(58) Field of Classification Search
CPC .......................... F16H 57/0498; F16H 57/0424
See application file for complete search history.

(56) References Cited

U.S. PATENT DOCUMENTS

| 4,827,790 | A | 5/1989 | Bisiach |
| 2002/0048420 | A1* | 4/2002 | Kato ....................... F16H 1/166 |
| | | | 384/618 |

(Continued)

FOREIGN PATENT DOCUMENTS

| CN | 101476615 A | 7/2009 |
| CN | 204041726 U | 12/2014 |

(Continued)

OTHER PUBLICATIONS

USPTO Machine Translation (retrieved from FIT database) of the Description of JP 2007092788 A, Hongo et al., Apr. 12, 2007. (Year: 2023).*

(Continued)

*Primary Examiner* — Daniel D Yabut
(74) *Attorney, Agent, or Firm* — Browdy and Neimark, PLLC

(57) ABSTRACT

A rotary table (1) includes a base body (10), a worm wheel (21), an inner ring (22), a plurality of rolling elements, and a worm screw unit (30). The worm screw unit (30) includes a worm screw (31) held to be rotatable around an axis and having a second gear (31A) meshing with the first gear (215), and a worm screw housing (32) surrounding and holding the worm screw (31) and being fixed to contact the holding surface at a planar contacting surface thereof. One of the holding and contacting surfaces has a cylindrical pin (33) arranged to protrude therefrom. The other of the holding and contacting surfaces has a first recess (11) formed to receive the pin (33), the first recess having a width corre- (Continued)

sponding to the pin (33) and being elongated in the radial direction of the worm wheel (21).

14 Claims, 14 Drawing Sheets

(51) Int. Cl.
    *F16H 57/12* (2006.01)
    *F16H 57/031* (2012.01)
(52) U.S. Cl.
    CPC ... *F16H 57/039* (2013.01); *F16H 2057/0213* (2013.01); *F16H 57/031* (2013.01); *F16H 57/0424* (2013.01); *F16H 57/0498* (2013.01)

(56) References Cited

U.S. PATENT DOCUMENTS

| | | | |
|---|---|---|---|
| 2017/0335923 A1* | 11/2017 | Smith | F16H 1/16 |
| 2019/0040945 A1* | 2/2019 | Ueda | F16H 57/022 |
| 2020/0003255 A1 | 1/2020 | Hirota et al. | |

FOREIGN PATENT DOCUMENTS

| | | | | |
|---|---|---|---|---|
| JP | 63149474 A | | 6/1988 | |
| JP | 5026330 A | | 2/1993 | |
| JP | 10132037 A | * | 5/1998 | |
| JP | 2005207532 A | * | 8/2005 | ............ B25J 9/103 |
| JP | 2007092788 A | | 4/2007 | |
| JP | 2011177841 A | | 9/2011 | |
| JP | 2017096424 A | | 6/2017 | |
| JP | 2018138787 A | | 9/2018 | |
| WO | 2012075737 A1 | | 6/2012 | |

OTHER PUBLICATIONS

USPTO Machine Translation (retrieved from FIT database) of the Description of JP 2017096424 A, Fukushima et al., Jun. 1, 2017. (Year: 2023).*

* cited by examiner

ROTARY TABLE

TECHNICAL FIELD

The present invention relates to a rotary table. The present application claims priority based on Japanese Patent Application No. 2020-005902 filed on Jan. 17, 2020, the entire contents of which are incorporated herein by reference.

BACKGROUND ART

A rotary table including a worm wheel having a first gear formed over the entire area in the circumferential direction and a worm screw having a second gear that meshes with the first gear is known (see, e.g., Patent Literature 1).

CITATION LIST

Patent Literature

Patent Literature 1: Japanese Patent Application Laid-Open No. 2011-177841

SUMMARY OF INVENTION

Technical Problem

In the above-described rotary table, a clearance (backlash) between the first gear on the worm wheel and the second gear on the worm screw is adjusted to ensure smooth rotation of the worm wheel and the worm screw. It is preferable that the backlash between the first gear and the second gear is adjusted with ease. Therefore, one of the objects is to provide a rotary table capable of easy adjustment of the backlash between the gears on the worm wheel and the worm screw.

Solution to Problem

A rotary table according to the present disclosure includes: a base body having a planar holding surface; a worm wheel disposed on the base body to be rotatable around an axis, the worm wheel having an outer circumferential surface with a first gear formed over an entire area in a circumferential direction; an inner ring disposed on an inner circumference side of the worm wheel and fixed to the base body; a plurality of rolling elements disposed to be able to roll on an inner circumferential surface of the worm wheel and an outer circumferential surface of the inner ring; and a worm screw unit fixed on the holding surface. The worm screw unit includes a worm screw held to be rotatable around an axis, the worm screw having a second gear meshing with the first gear, and a worm screw housing surrounding and holding the worm screw, the worm screw housing being fixed to contact the holding surface at a planar contacting surface thereof. One of the holding surface and the contacting surface has a cylindrical pin arranged to protrude therefrom. The other of the holding surface and the contacting surface has a first recess formed to receive the pin, the first recess having a width corresponding to the pin and being elongated in a radial direction of the worm wheel.

Advantageous Effects of Invention

According to the above rotary table, the backlash between the gears on the worm wheel and the worm screw can be easily adjusted.

DESCRIPTION OF EMBODIMENTS

[Outline of Embodiments]

Figure 1:
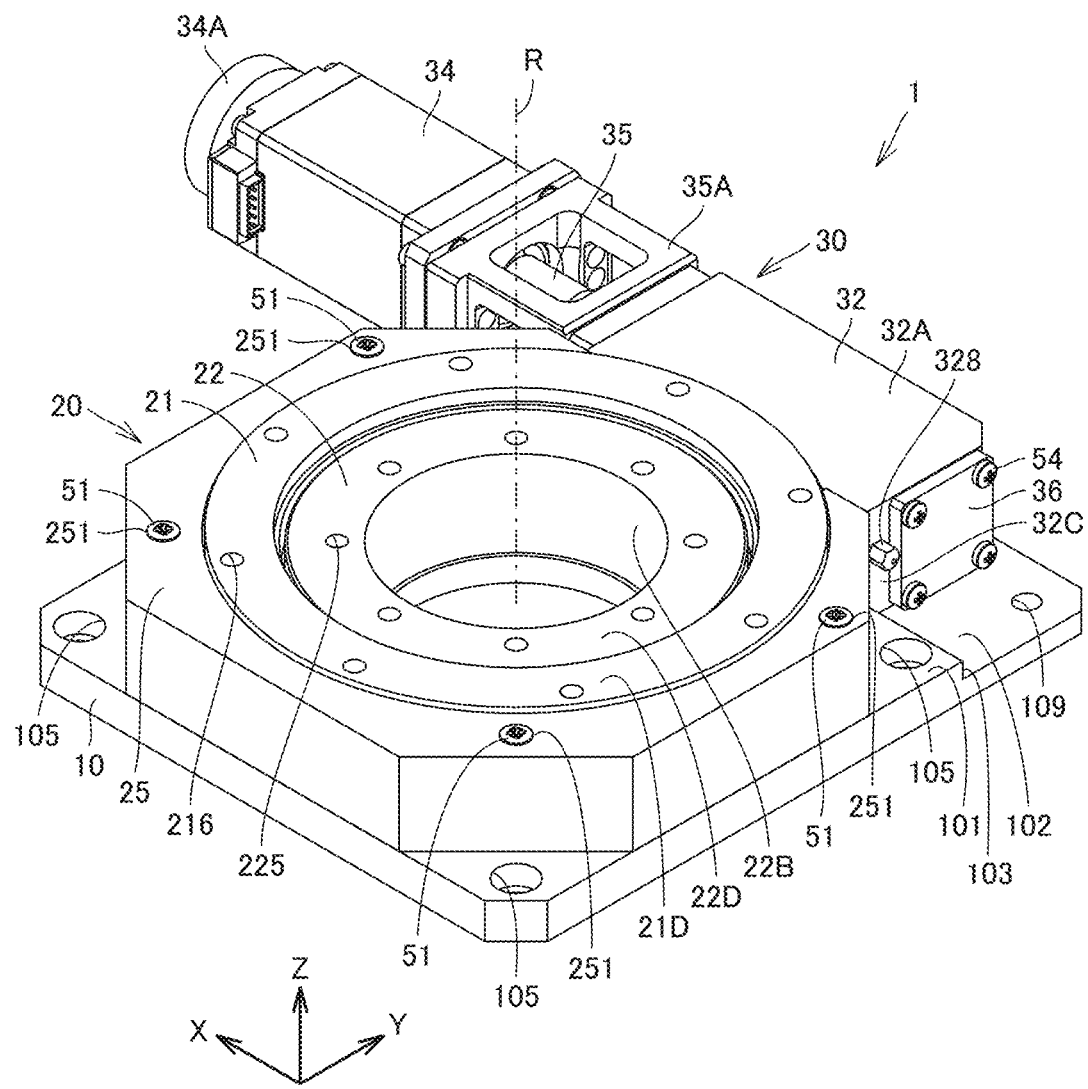
FIG. 1 is a schematic perspective view showing the structure of a rotary table in Embodiment 1.

First, embodiments of the present disclosure will be listed and described. A rotary table of the present disclosure includes: a base body having a planar holding surface; a worm wheel disposed on the base body to be rotatable around an axis, the worm wheel having an outer circumferential surface with a first gear formed over an entire area in a circumferential direction; an inner ring disposed on an inner circumference side of the worm wheel and fixed to the base body; a plurality of rolling elements disposed to be able to roll on an inner circumferential surface of the worm wheel and an outer circumferential surface of the inner ring; and a worm screw unit fixed on the holding surface. The worm screw unit includes a worm screw held to be rotatable around an axis, the worm screw having a second gear meshing with the first gear, and a worm screw housing surrounding and holding the worm screw, the worm screw housing being fixed to contact the holding surface at a planar contacting surface thereof. One of the holding surface and the contacting surface has a cylindrical pin arranged to protrude therefrom. The other of the holding surface and the contacting surface has a first recess formed to receive the pin, the first recess having a width corresponding to the pin and being elongated in a radial direction of the worm wheel.

In the rotary table of the present disclosure, the cylindrical pin is arranged on one of the holding surface and the contacting surface, and the first recess is formed in the other of the holding surface and the contacting surface. The first recess has a width corresponding to the pin and has a shape elongated in the radial direction of the worm wheel. In the state before the worm screw housing is fixed to the base body, a pin being inserted into the first recess allows the worm screw housing to move in the radial direction, while regulating the movement of the worm screw housing in the tangential direction of the worm wheel. The worm screw housing is further allowed to rotate with respect to the base body using the pin as a pivot point. In such a state, the pin is inserted into the first recess, the worm screw unit is brought closer to the first gear along the radial direction of the worm screw, and the first gear and the second gear are brought into contact with each other with appropriate force. Then, with the worm screw housing being moved in the radial direction and rotated with the pin as the pivot point as described above, the backlash between the first gear and the second gear is adjusted appropriately. It thus becomes easy to adjust the backlash between the first and second gears. As such, according to the rotary table of the present disclosure, the backlash between the gears on the worm wheel and the worm screw can be easily adjusted.

In the above rotary table, at least one of the base body and the worm screw housing may have a screw hole formed in communication with the first recess, the screw hole having an opening facing an outer circumferential surface of the pin. The rotary table may further include a first screw screwed into the screw hole, the first screw having a tip end portion coming into contact with the outer circumferential surface of the pin. Following adjustment of the relative position of the worm screw housing to the base body, the first screw is screwed into the screw hole to make the tip end portion contact the outer circumferential surface of the pin. This can regulate the relative movement of the worm screw housing with respect to the base body. It is therefore possible to suppress changes over time of the backlash between the first gear and the second gear.

In the above rotary table, the worm screw housing may have an opposing surface that faces the outer circumferential surface of the worm wheel. The opposing surface may have a first through hole formed to expose the second gear. The worm screw housing may include a flange portion that protrudes from the opposing surface and covers a side face that, of the first gear facing the opposing surface, is on an opposite side from the base body in an axial direction of the worm wheel. Adopting such a configuration can reduce entry of foreign matter into the region where the first and second gears come into contact and also reduce splattering of the grease to the outside of the rotary table.

In the above rotary table, the worm screw housing may have a lubrication hole formed to penetrate from an outer wall other than the opposing surface to the opposing surface. The lubrication hole may have a first opening on the opposing surface. The first opening may be formed away from the first through hole in the circumferential direction of the worm wheel. With the lubrication hole thus formed, the first and second gears can be lubricated in the state where the worm screw housing is fixed to the base body. Further, performing the lubrication, in the state where the worm wheel and the worm screw are rotating, from the upper side of the rotation in the region where the first and second gears are contacting each other facilitates lubrication on the region where the first and second gears come into contact.

The above rotary table may further include a cover member that surrounds the first gear and is fixed to the base body. Inclusion of such a cover member can reduce splattering of the grease to the outside of the rotary table.

In the above rotary table, the rolling elements may include first rollers and second rollers. The first rollers and the second rollers may be arranged alternately in the circumferential direction. The first rollers may have a central axis intersecting a central axis of the second rollers. By the rolling elements including the first and second rollers as described above, a rolling bearing can be configured which is suitable for supporting loads applied in a plurality of directions by the worm wheel and the inner ring.

Specific Embodiments

Specific embodiments of the rotary table of the present disclosure will be described below with reference to the drawings. In the drawings referenced below, the same or corresponding portions are denoted by the same reference numerals and the description thereof will not be repeated.

Embodiment 1

Figure 2:
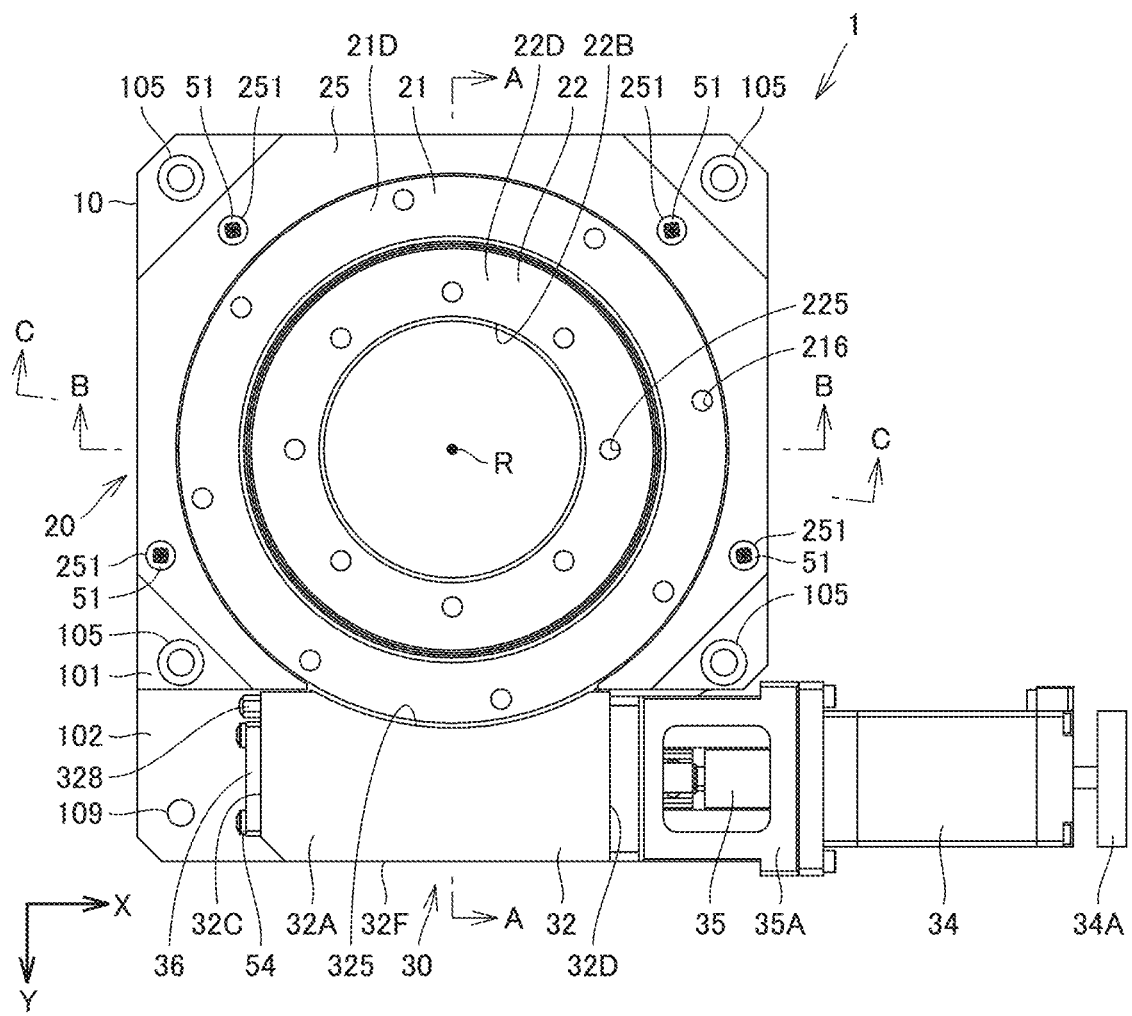
FIG. 2 is a schematic plan view showing the structure of the rotary table in Embodiment 1.
Figure 3:
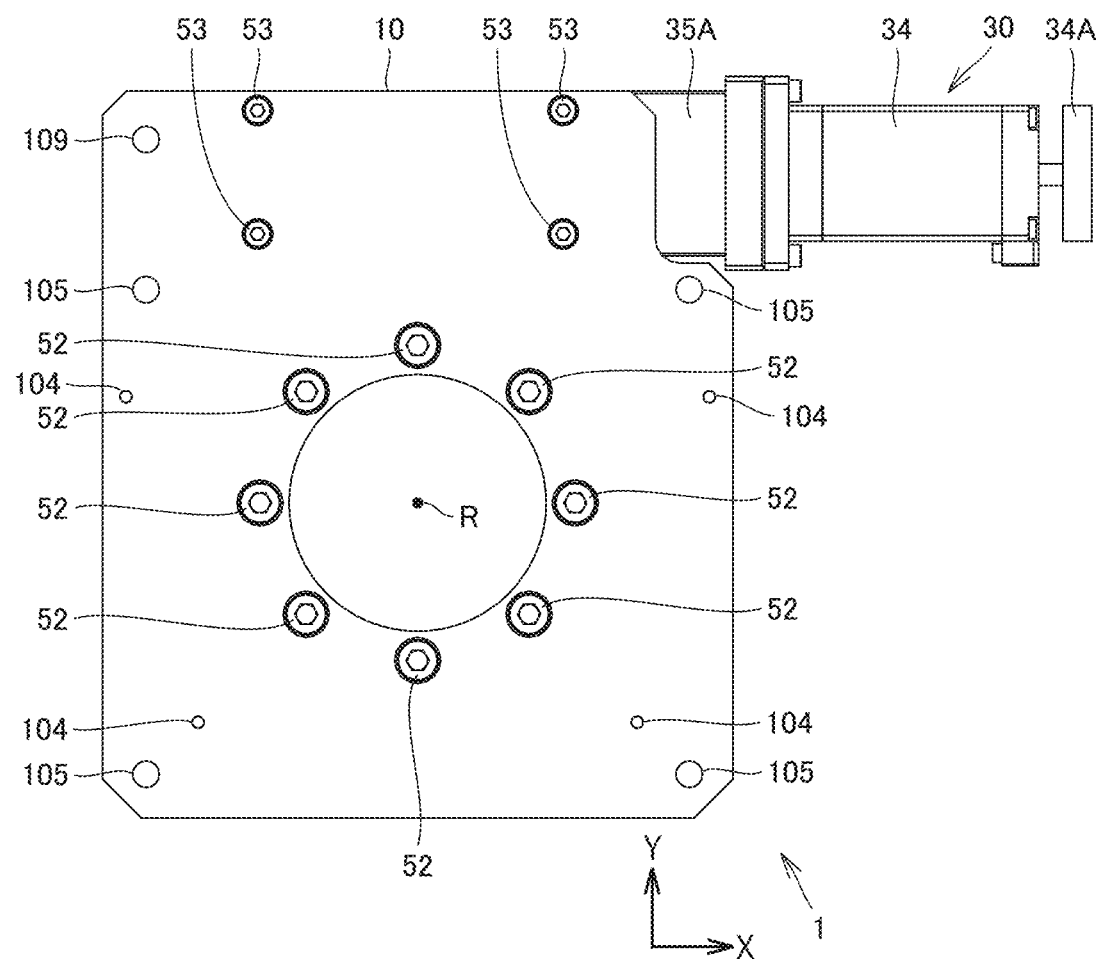
FIG. 3 is a schematic plan view showing the structure of the rotary table in Embodiment 1.
Figure 5:
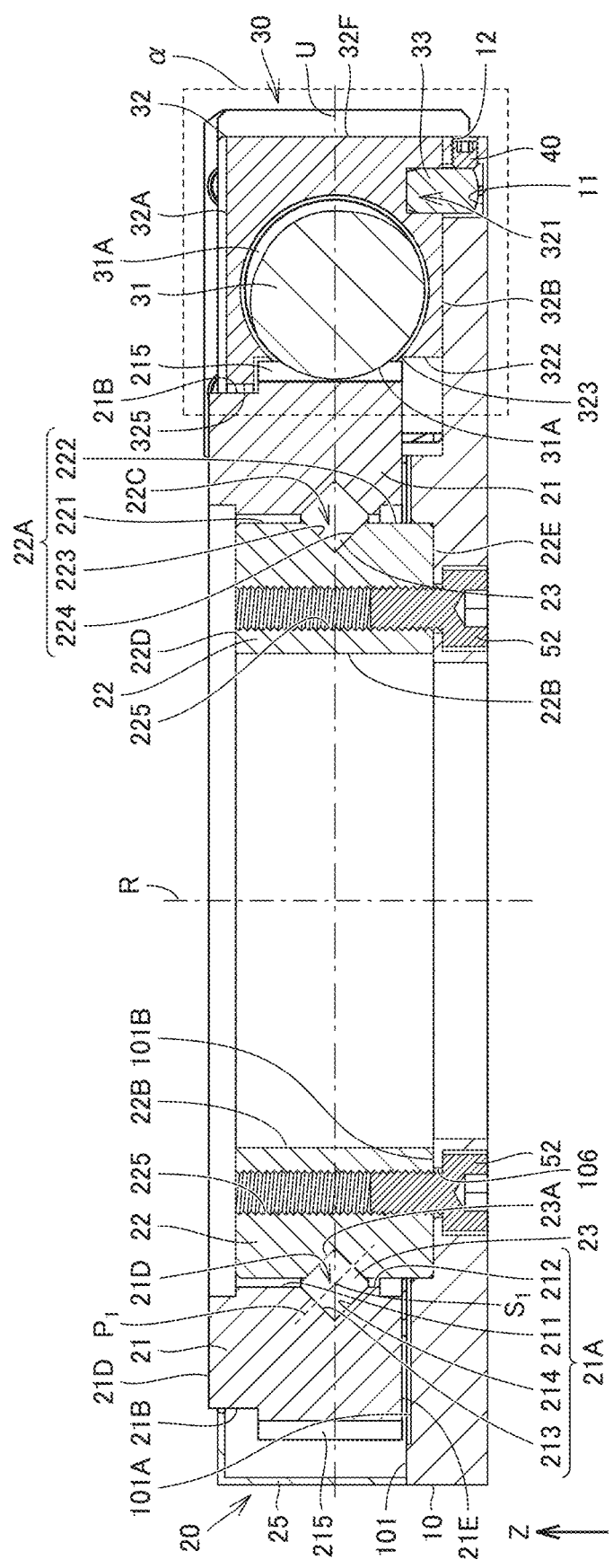
FIG. 5 is a schematic cross-sectional view showing the structure of the rotary table in Embodiment 1.
Figure 6:
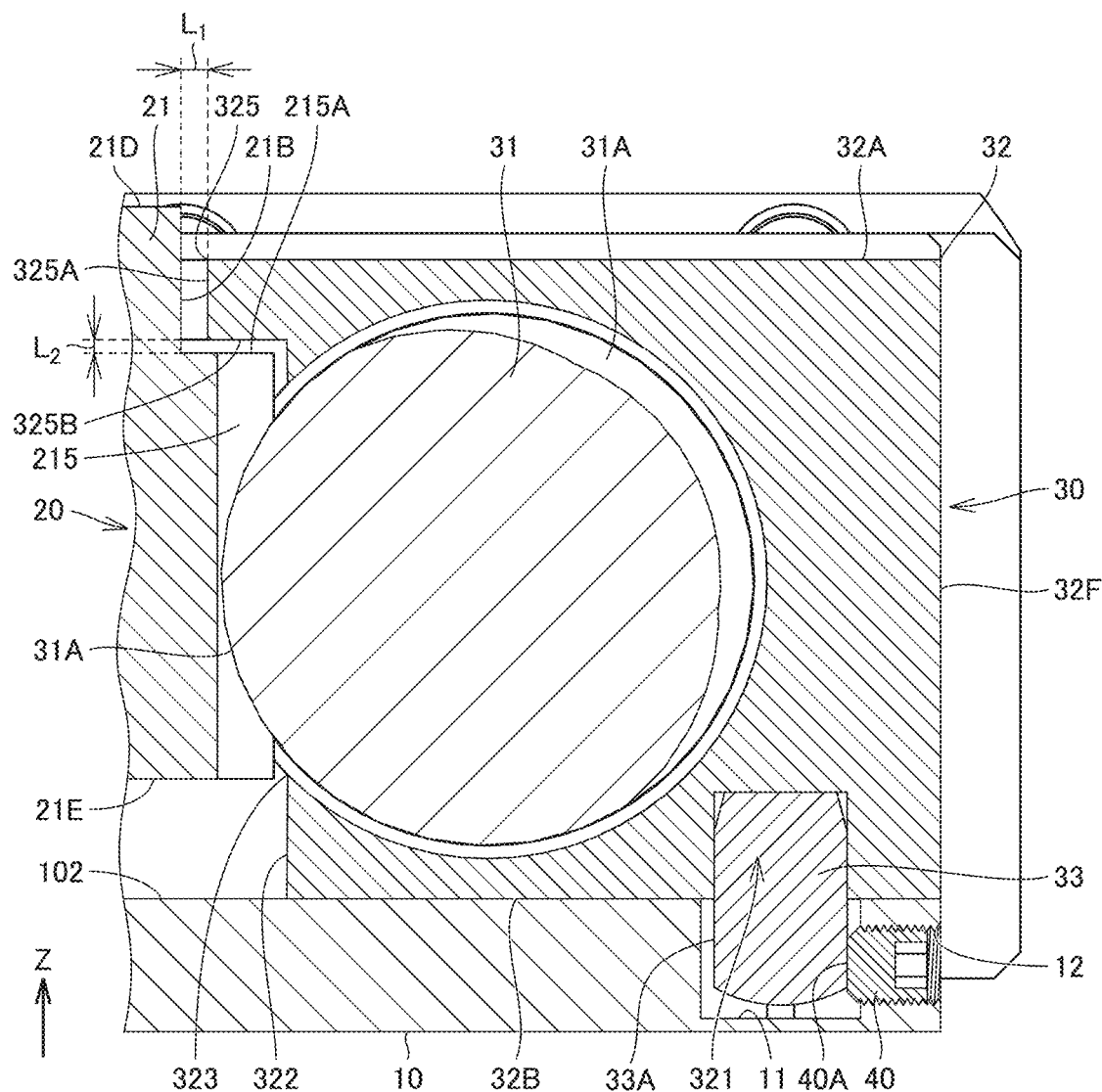
FIG. 6 is a schematic cross-sectional view showing the structure of the rotary table in Embodiment 1.
Figure 7:
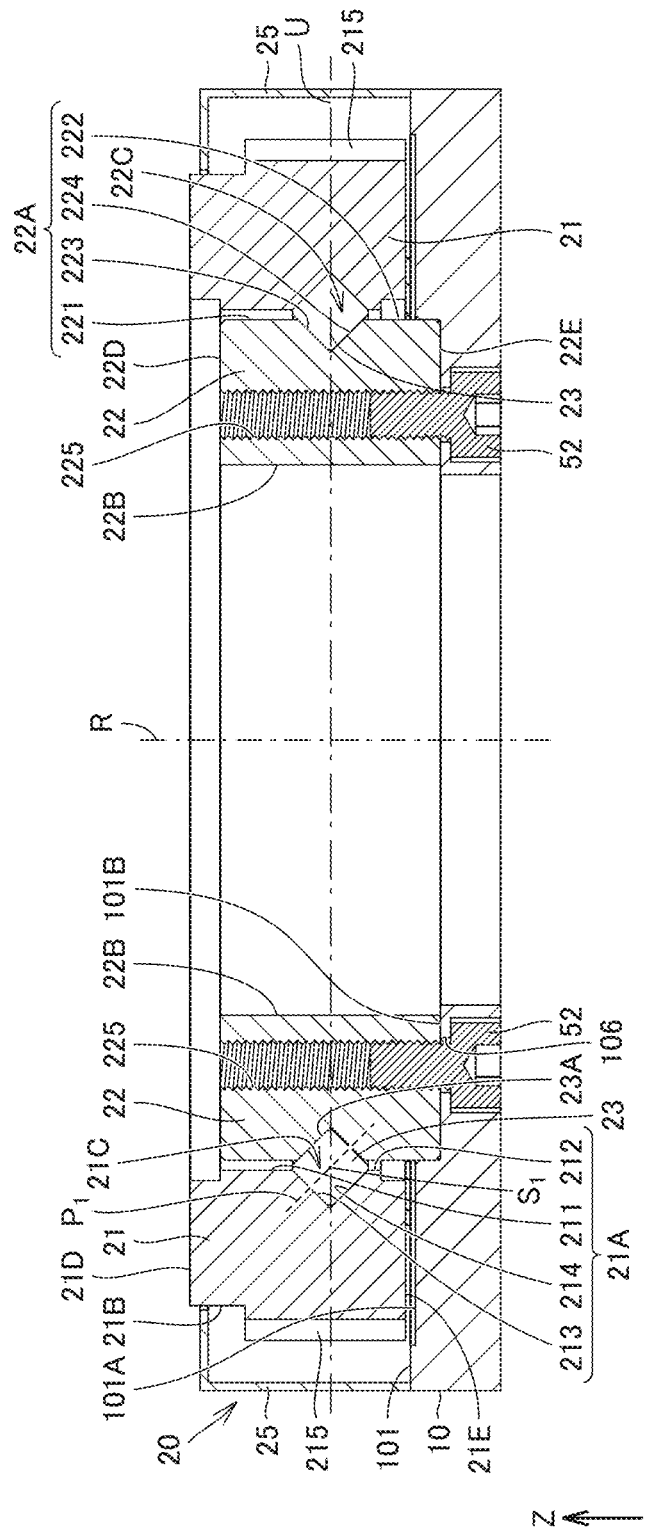
FIG. 7 is a schematic cross-sectional view showing the structure of the rotary table in Embodiment 1.
Figure 8:
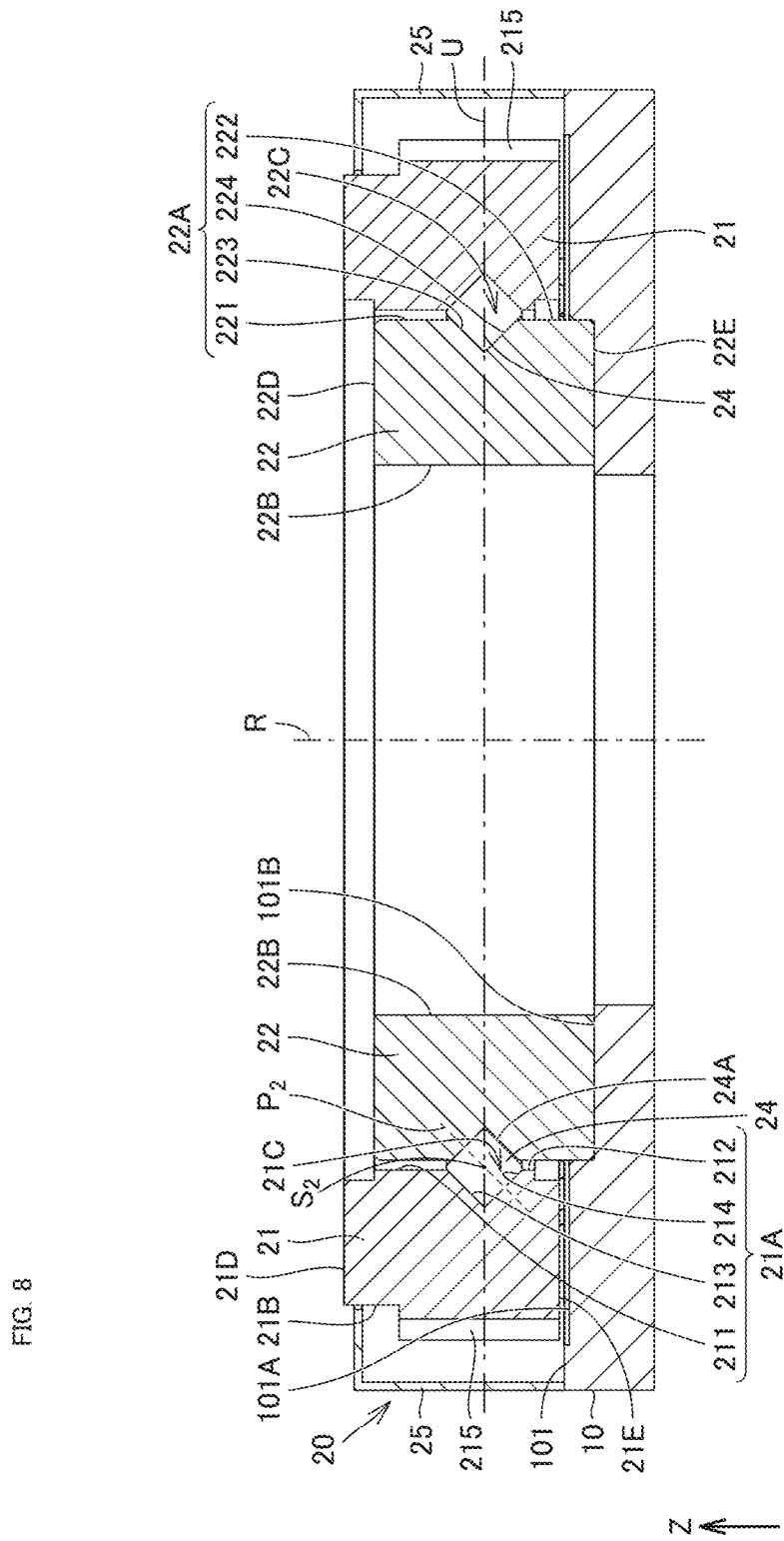
FIG. 8 is a schematic cross-sectional view showing the structure of the rotary table in Embodiment 1.
Figure 11:
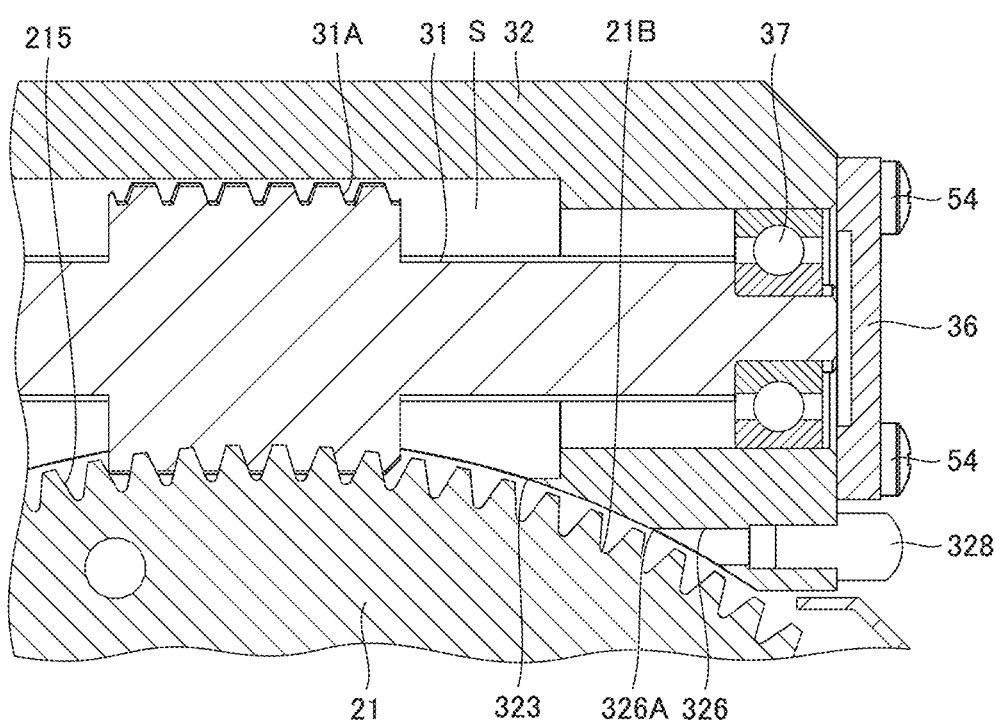
FIG. 11 is a schematic cross-sectional view showing the structure of the rotary table in Embodiment 1.
Figure 12:
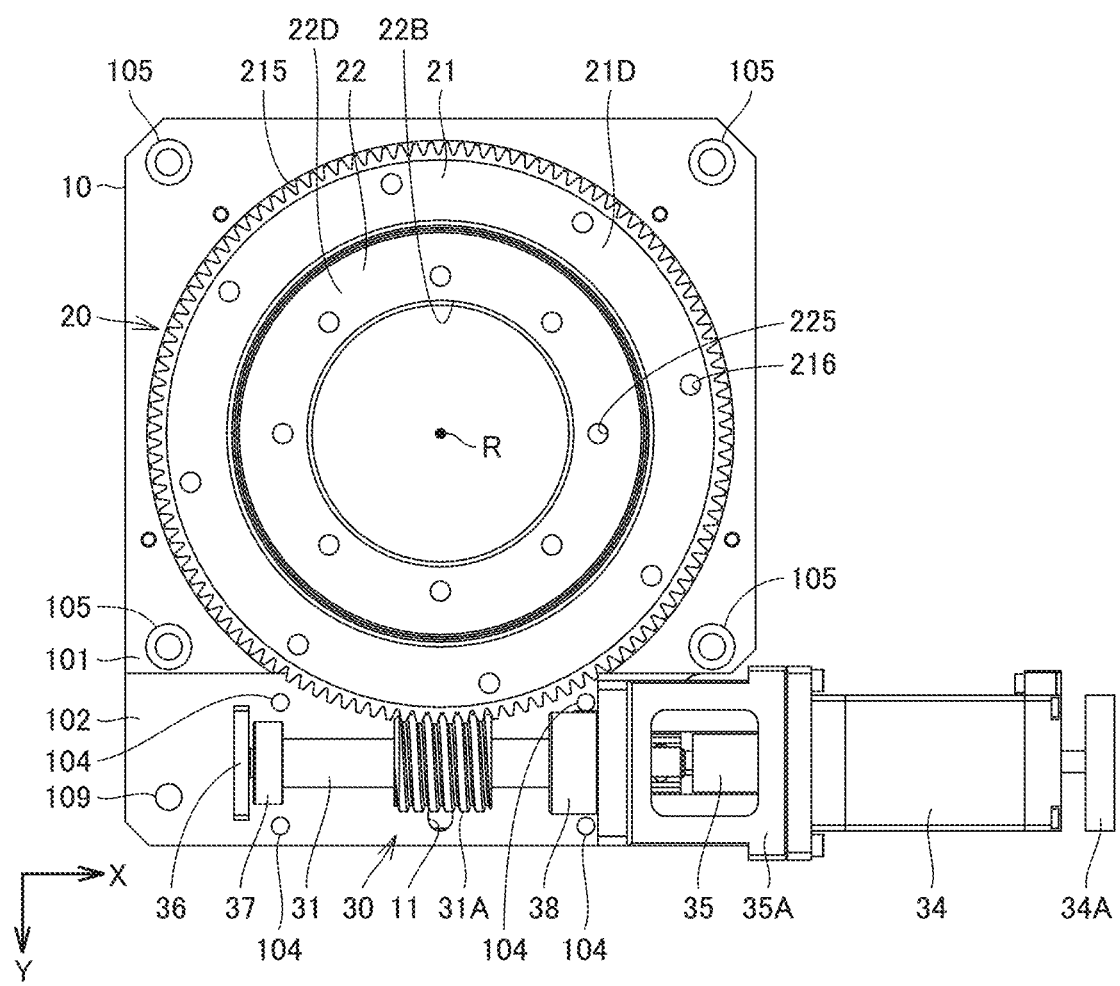
FIG. 12 is a schematic plan view showing the structure of the rotary table, with the cover member and the worm screw housing removed therefrom.

FIG. 1 is a schematic perspective view showing the structure of a rotary table in Embodiment 1. In FIG. 1, the Z axis direction is a direction (axial direction) along which a rotational axis R of the worm wheel extends. FIG. 2 is a schematic plan view showing the structure of the rotary table. FIG. 3 is a plan view of the rotary table seen from the opposite side of FIG. 2. FIG. 5 is a cross-sectional view of the rotary table taken along A-A in FIG. 2. FIG. 6 is an enlarged cross-sectional view of a region a in FIG. 5. FIG. 7 is a cross-sectional view of the rotary table taken along B-B in FIG. 2. FIG. 8 is a cross-sectional view of the rotary table taken along C-C in FIG. 2. FIG. 11 is an enlarged cross-sectional view of the vicinity of a region where the first gear and the second gear come into contact. FIG. 12 is a plan view of the rotary table corresponding to FIG. 2, with the cover member and the worm screw housing removed therefrom.

Referring to FIGS. 1 to 3, the rotary table 1 in Embodiment 1 includes a base body 10, a rolling bearing unit 20, a worm screw unit 30, and screws 51, 52, and 53.

Figure 4:
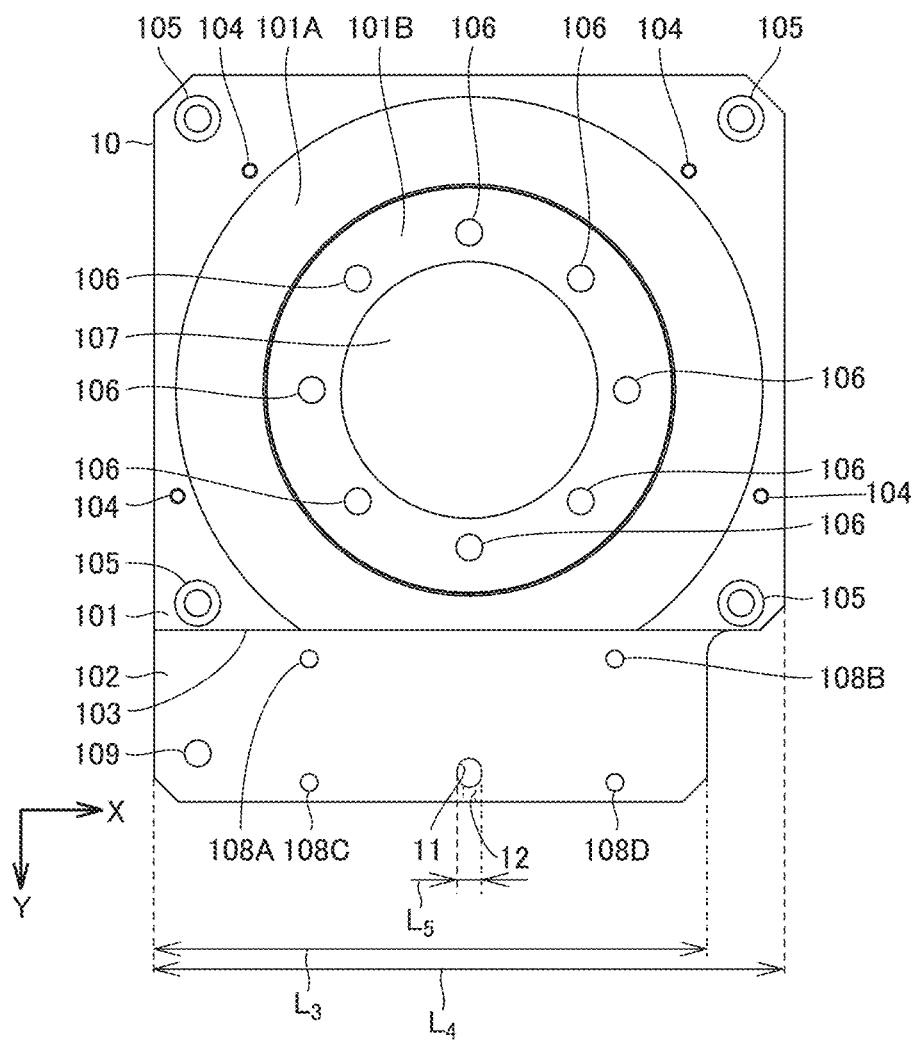
FIG. 4 is a schematic plan view showing the structure of a base body.

Referring to FIG. 1, the base body 10 has a plate-like shape. Referring to FIG. 4, the base body 10 has a first surface 101, a second surface 102 as the holding surface, and a third surface 103. In plan view in the Z axis direction, the first surface 101 and the second surface 102 are alongside of each other in the Y axis direction. Referring to FIG. 1, the region corresponding to the first surface 101 is greater in thickness than the region corresponding to the second surface 102. That is, the height of the second surface 102 in the Z axis direction is lower than the height of the first surface 101. The first surface 101 and the second surface 102 are connected via the third surface 103. Referring to FIG. 4, the first surface 101 has a planar shape. In plan view in the Z axis direction, the first surface 101 has a rectangular shape. The first surface 101 has four through holes 105 formed at the corners penetrating in the thickness direction. In the first surface 101, a through hole 107 is formed penetrating in the thickness direction. In plan view in the Z axis direction, the through hole 107 has a circular shape. In plan view in the Z axis direction, the first surface 101 has an annular recess 101B formed to surround the through hole 107. Further, a ring-shaped recess 101A is formed to surround the recess 101B. Referring to FIG. 7, the region in the first surface 101 corresponding to the recess 101A has a thickness greater than that of the region in the first surface 101 corresponding to the recess 101B. Referring to FIG. 4, the recesses 101A and 101B have shapes corresponding respectively to a worm wheel 21 and an inner ring 22 (see FIG. 1), which will be described later. The recess 101B has a plurality of (in the present embodiment, eight) screw holes 106 formed at equal intervals in the circumferential direction. The first surface 101 has, on an outer circumference side of the recess 101A, a plurality of (in the present embodiment, four) screw holes 104 formed at intervals in the circumferential direction.

Referring to FIG. 4, the second surface 102 has a rectangular shape in plan view in the Z axis direction. The second surface 102 has a length $L_3$ in the X axis direction that is shorter than a length $L_4$ in the X axis direction of the first surface 101. The second surface 102 has a planar shape. The second surface 102 has fourth through holes 108A, 108B, 108C, and 108D formed penetrating in the thickness direction. The through holes 108A, 108B, 108C, and 108D each have an inner diameter greater than an outer diameter of a threaded portion in a screw 53 (see FIG. 3), which will be described later. In the second surface 102, a first recess 11 is formed between the through hole 108C and the through hole 108D. In plan view in the Z axis direction, the first recess 11 is formed in a region that is close to a long side on the opposite side from the first surface 101 with respect to the center of the second surface 102 in the Y axis direction. A through hole 109 penetrating in the thickness direction is formed on an opposite side from the first recess 11 with respect to the through hole 108C in the X axis direction. Referring to FIGS. 4 and 6, the base body 10 has a first screw hole 12 formed in communication with the first recess 11. The first screw hole 12 extends along the Y axis direction.

Referring to FIGS. 7 and 8, the rolling bearing unit 20 includes a worm wheel 21 as an outer ring, an inner ring 22, a plurality of first rollers 23 and a plurality of second rollers 24 as a plurality of rolling elements, and a cover member 25. The worm wheel 21 is disposed on the first surface 101 of the base body 10. The worm wheel 21 is arranged to correspond to the position where the recess 101A is formed in the first surface 101. The worm wheel 21 is arranged such that the direction along the rotational axis R of the worm wheel 21 coincides with a direction (Z axis direction) perpendicular to the first surface 101. The worm wheel 21 has an annular shape.

The worm wheel 21 includes an inner circumferential surface 21A, an outer circumferential surface 21B, one end face 21D in the axial direction, and an end face 21E opposite to the end face 21D in the axial direction. The outer circumferential surface 21B has a first gear 215 formed over the entire area in the circumferential direction. The inner circumferential surface 21A includes a first region 211 and a second region 212. The first region 211 is arranged on the end face 21D side with respect to the center of the inner circumferential surface 21A in the axial direction. The second region 212 is arranged on the end face 21E side with respect to the center of the inner circumferential surface 21A in the axial direction. In the Z axis direction, an annular recessed space 21C is formed between the first region 211 and the second region 212. The space 21C is surrounded by an annular first rolling surface 213 and an annular second rolling surface 214. The first rolling surface 213 and the second rolling surface 214 intersect (orthogonally) with each other. The space 21C is formed along the rolling path of the plurality of first rollers 23 and the plurality of second rollers 24. Referring to FIGS. 1 and 2, the worm wheel 21 has a plurality of (in the present embodiment, eight) screw holes 216 formed at equal intervals in the circumferential direction.

Referring to FIGS. 7 and 8, the inner ring 22 has an annular shape. The inner ring 22 is disposed on the inner circumference side of the worm wheel 21. The inner ring 22 is arranged to correspond to the position where the recess 101B is formed in the first surface 101. The inner ring 22 includes an outer circumferential surface 22A, an inner circumferential surface 22B, one end face 22D in the axial direction, and an end face 22E opposite to the end face 22D in the axial direction. The outer circumferential surface 22A includes a third region 221 and a fourth region 222. The third region 221 is arranged on the end face 22D side with respect to the center of the outer circumferential surface 22A in the axial direction. The fourth region 222 is arranged on the end face 22E side with respect to the center of the outer circumferential surface 22A in the axial direction. In the Z axis direction, an annular recessed space 22C is formed between the third region 221 and the fourth region 222. The space 22C is surrounded by an annular third rolling surface 223 and an annular fourth rolling surface 224. The third rolling surface 223 and the fourth rolling surface 224 intersect (orthogonally) with each other. The space 22C is formed along the rolling path of the plurality of first rollers 23 and the plurality of second rollers 24. The first rolling surface 213 and the fourth rolling surface 224 oppose each other. In the present embodiment, in a cross section including the rotational axis R, the first rolling surface 213 and the fourth rolling surface 224 are arranged in parallel. The second rolling surface 214 and the fourth rolling surface 224 oppose each other. In the present embodiment, in a cross section including the rotational axis R, the second rolling surface 214 and the fourth rolling surface 224 are arranged in parallel.

Referring to FIG. 1, the inner ring 22 has a plurality of (in the present embodiment, eight) screw holes 225 formed at equal intervals in the circumferential direction. Referring to FIGS. 2 and 4, the positions where the screw holes 225 are formed are aligned with the positions where the screw holes 106 are formed in the base body 10, and the screws 52 (see FIG. 3) are screwed into the screw holes 106, 225. The inner ring 22 is thus fixed to the base body 10.

Referring to FIGS. 7 and 8, the first rollers 23 and the second rollers 24 have a cylindrical shape. The first rollers 23 and the second rollers 24 are arranged alternately in the circumferential direction. The first rollers 23 are arranged to be able to roll while contacting the second rolling surface 214 and the third rolling surface 223 at their outer circumferential surfaces 23A. The second rollers 24 are arranged to be able to roll while contacting the first rolling surface 213 and the fourth rolling surface 224 at their outer circumferential surfaces 24A. A first roller 23 has a central axis $P_1$ that intersects (is orthogonal to) a central axis $P_2$ of a second roller 24. Here, the state in which the central axis $P_1$ of the first roller 23 intersects the central axis $P_2$ of the second roller 24 means that when the center of gravity of the first roller 23 and the second roller 24 passes through a predetermined point during rotation of the worm wheel 21, the central axis $P_1$ of the first roller 23 and the central axis $P_2$ of the second roller 24 intersect (orthogonally) with each other. In this manner, the worm wheel 21 is capable of rotating around the rotational axis R with respect to the base body 10.

Referring to FIG. 7, the cover member 25 is disposed on the first surface 101. The cover member 25 is arranged on the outer circumference side of the worm wheel 21. The cover member 25 has a ring shape. The cover member 25 surrounds the first gear 215. In the present embodiment, the first gear 215 is exposed from a partial region of the cover member 25. Referring to FIG. 2, the cover member 25 has a plurality of (in the present embodiment, four) screw holes 251 formed at intervals in the circumferential direction. Referring to FIGS. 2 and 4, the positions where the screw holes 251 are formed are aligned with the positions where the screw holes 104 are formed in the base body 10, and the screws 51 are screwed into the screw holes 104, 251. The cover member 25 is thus fixed to the base body 10.

Figure 9:
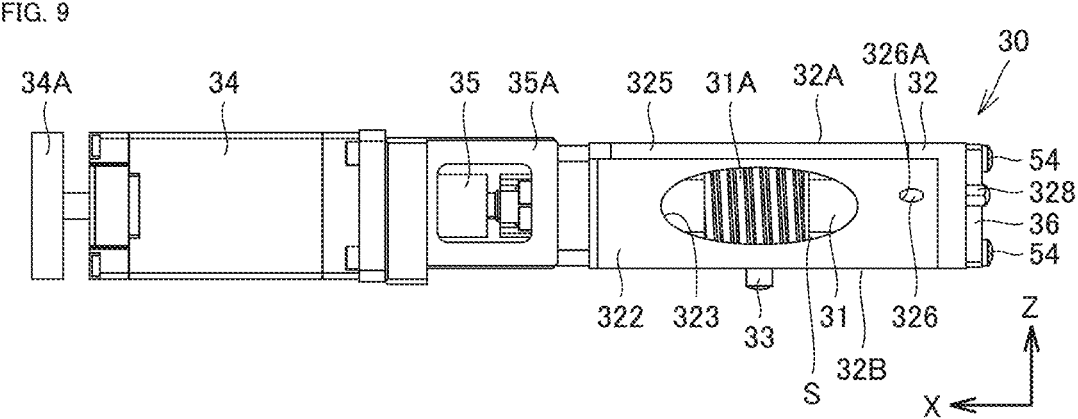
FIG. 9 is a schematic side view showing the structure of a worm screw unit.

Referring to FIG. 1, the worm screw unit 30 is disposed on the second surface 102. Referring to FIGS. 9 and 12, the worm screw unit 30 includes a worm screw 31, a worm screw housing 32, a pin 33, a motor 34, a coupling 35, a lid 36, a first support bearing 37, and a second support bearing 38. The worm screw 31 has a columnar shape. The worm screw 31 has a second gear 31A formed on its outer circumferential surface. The second gear 31A meshes with the first gear 215. The lid 36 is arranged on one end side of the worm screw 31. The worm screw 31 is supported by the first support bearing 37 so as to be rotatable with respect to the lid 36. The coupling 35 is arranged on another end side of the worm screw 31. The motor 34 is fixed to a motor housing 35A via screws. For the motor 34 in the present embodiment, for example, a stepping motor or an AC servomotor can be adopted. The worm screw 31 is supported by the second support bearing 38 so as to be rotatable with respect to the coupling 35. The worm screw 31 is connected to the motor 34 via the coupling 35. The motor 34 is electrically connected to an external power source (not shown). The motor 34 has a ring 34A for manual rotation.

Figure 10:
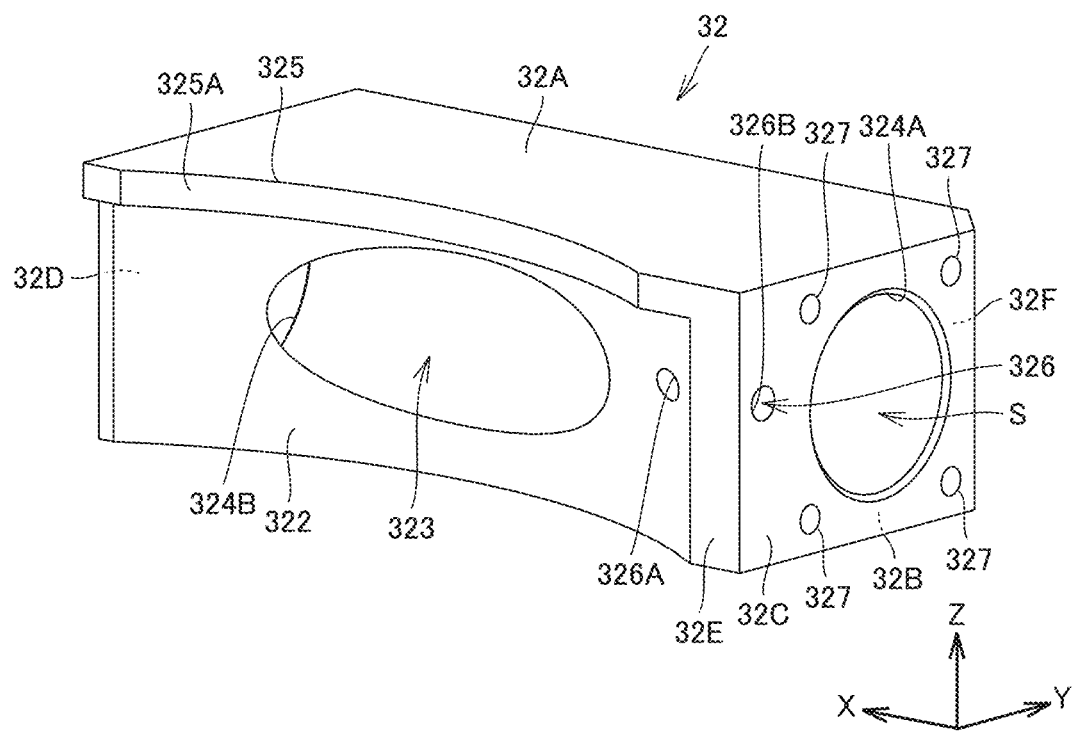
FIG. 10 is a schematic perspective view showing the structure of a worm screw housing.

Referring to FIG. 10, the worm screw housing 32 has a rectangular parallelepiped shape with an internal space S formed therein. The worm screw housing 32 includes a first outer wall surface 32A, a second outer wall surface 32B as the contacting surface, a third outer wall surface 32C, a fourth outer wall surface 32D, a fifth outer wall surface 32E, and a sixth outer wall surface 32F. The first outer wall surface 32A, the second outer wall surface 32B, the third outer wall surface 32C, the fourth outer wall surface 32D, and the sixth outer wall surface 32F have a planar shape. The first outer wall surface 32A and the second outer wall surface 32B are arranged aligned in the Z axis direction. The first outer wall surface 32A and the second outer wall surface 32B are arranged in parallel. The third outer wall surface 32C and the fourth outer wall surface 32D are arranged aligned in the X axis direction. The third outer wall surface 32C and the fourth outer wall surface 32D are arranged in parallel. The fifth outer wall surface 32E and the sixth outer wall surface 32F are arranged aligned in the Y axis direction.

Referring to FIG. 6, the second outer wall surface 32B has a recess 321 formed therein. Referring to FIG. 10, the third outer wall surface 32C has an opening 324A formed in communication with the internal space S. Four screw holes 327 are formed around the opening 324A. The fourth outer wall surface 32D has an opening 324B formed in communication with the internal space S. The fifth outer wall surface 32E has a curved (arc-shaped) opposing surface 322 recessed in the Y axis direction. The opposing surface 322 has a first through hole 323 formed in communication with the internal space S. The worm screw housing 32 has a flange portion 325 that protrudes from the opposing surface 322 in the Y axis direction. The flange portion 325 has a tip end portion 325A in its protruding direction, having a curved surface (arc) shape. The tip end portion 325A constitutes a part of the fifth outer wall surface 32E.

The worm screw housing has a lubrication hole 326 formed to penetrate from the third outer wall surface 32C to the opposing surface 322. The lubrication hole 326 has a first opening 326A on the opposing surface 322 and a second opening 326B on the third outer wall surface 32C. The first opening 326A is formed spaced apart from the first through hole 323 in the X axis direction. A grease nipple 328 (see FIG. 11) is mounted so as to seal the second opening 326B. The grease nipple 328 thus mounted facilitates adjusting the amount of grease.

Referring to FIG. 6, a cylindrical pin 33 is disposed to protrude from the second outer wall surface 32B. The pin 33 is fitted in the recess 321 in the second outer wall surface 32B. In the present embodiment, the pin 33 has an outer diameter slightly smaller than a width $L_5$ (see FIG. 4) of the first recess 11 in the X axis direction.

Referring to FIGS. 9 and 10, the positions where the screw holes 327 are formed in the worm screw housing 32 are aligned with the positions where screw holes (not shown) are formed in the lid 36, and screws 54 are screwed in. The worm screw housing 32 is thus fixed to the lid 36. Referring to FIGS. 9 and 11, the worm screw housing 32 surrounds the worm screw 31. The worm screw 31 is accommodated in the internal space S formed in the worm screw housing 32. The second gear 31A of the worm screw 31 is exposed from the first through hole 323 in the worm screw housing. Referring to FIG. 6, the second outer wall surface 32B of the worm screw housing 32 is in contact with the second surface 102 of the base body 10. The opposing surface 322 of the worm screw housing 32 is opposite to the outer circumferential surface 21B of the worm wheel 21. The second gear 31A exposed from the first through hole 323 in the opposing surface 322 meshes with the first gear 215 of the worm wheel 21.

Referring to FIG. 6, the flange portion 325 covers a side face 215A that, of the first gear 215 facing the opposing surface 322, is on the opposite side from the base body 10 in the Z axis direction. In the present embodiment, a distance $L_1$ between the side face 325A of the flange portion 325 and the outer circumferential surface 21B of the worm wheel 21 opposing the side face 325A is 1 mm or less. The distance $L_1$ is preferably 0.5 mm or more and 1 mm or less. A distance $L_2$ between a wall surface 325B of the flange portion 325 facing the side face 215A of the first gear 215 and the side face 215A of the first gear 215 is 1 mm or less. The distance $L_2$ is preferably 0.5 mm or more and 1 mm or less. Setting the distances $L_1$ and $L_2$ in the above-described range can reduce splattering of the grease to the outside of the rotary table 1. It also results in a labyrinth structure, which can reduce entry of foreign matter from the outside.

Referring to FIG. 6, the pin 33 is inserted into the first recess 11 of a long hole shape in the base body 10. The rotary table 1 further includes a hexagon socket set screw 40 as a first screw that is screwed into the first screw hole 12 in the base body 10. The hexagon socket set screw 40 has its tip end portion 40A coming into contact with an outer circumferential surface 33A of the pin 33. Referring to FIGS. 3 and 4, the positions where the through holes 108A, 108B, 108C, 108D are formed in the base body 10 are aligned with the positions where screw holes (not shown) are formed in the worm screw housing 32, and the screws 53 are screwed in. The worm screw housing 32 is thus fixed to the base body 10.

A description will now be made about the way of fixing the worm screw unit 30 to the base body 10 in the present embodiment. First, a structural body with the rolling bearing unit 20 attached to the base body 10 is prepared. Next, as shown in FIG. 2, the worm screw unit 30 is disposed on the base body 10. At this time, referring to FIG. 6, the pin 33, press-fitted in the recess 321 formed in the worm screw housing 32, is inserted into the first recess 11 in the base body 10. Then, referring to FIGS. 2, 3, and 4, the screws 53 are inserted into the through holes 108A, 108B, 108C, and 108D, so that the worm screw housing 32 is temporarily fixed to the base body 10. Next, referring to FIG. 2, the worm screw unit is brought closer to the first gear 215 along the radial direction of the worm screw, and the first gear 215 and the second gear 31A are made to contact each other with appropriate force. Next, referring to FIG. 6, the hexagon socket set screw 40 is screwed into the first screw hole 12. Then, referring to FIGS. 2 and 3, the screws 53 are further tightened, whereby the worm screw housing 32 is fixed to the base body 10.

Here, in the rotary table 1 in the present embodiment, the first recess 11 has a width corresponding to the pin 33 (width slightly wider than the outer diameter of the pin 33), and has a shape elongated in the radial direction of the worm wheel 21. Inserting the pin 33 into the first recess 11 makes it possible to allow the worm screw housing 32 to move in the radial direction, while restricting the movement of the worm screw housing 32 in the tangential direction of the worm wheel 21. It further allows the worm screw housing 32 to rotate with respect to the base body 10 using the pin 33 as a pivot point. As the worm screw unit 30 is brought closer to the first gear 215 along the radial direction of the worm screw and the first gear 215 and the second gear 31A are made to contact each other with appropriate force, the backlash between the first gear 215 and the second gear 31A is adjusted appropriately by the movement of the worm screw housing 32 in the radial direction and its rotation with the pin 33 as the pivot point as described above. Therefore, it becomes easy to adjust the backlash between the first gear 215 and the second gear 31A. As such, according to the rotary table 1 in the present embodiment, the backlash between the first gear 215 and the second gear 31A can be easily adjusted.

In the above embodiment, the first screw hole 12 is formed which is in communication with the first recess 11 and has an opening facing the outer circumferential surface of the pin 33. The rotary table 1 is provided with the hexagon socket set screw 40 which is screwed into the first screw hole 12 and has the tip end portion 40A coming into contact with the outer circumferential surface 33A of the pin 33. The hexagon socket set screw 40 is screwed into the first screw hole 12 after the relative position of the worm screw housing 32 to the base body 10 is adjusted. This can regulate the relative movement of the worm screw housing 32 with respect to the base body 10. It is therefore possible to suppress changes over time of the backlash between the first gear 215 and the second gear 31A.

In the above embodiment, the worm screw housing 32 has the opposing surface 322 that faces the outer circumferential surface 21B of the worm wheel 21. The worm screw housing 32 includes the flange portion 325 which protrudes from the opposing surface 322 and covers the side face 215A of the first gear 215 facing the opposing surface 322. Adopting such a configuration can reduce entry of foreign matter into the region where the first gear 215 and the second gear 31A come into contact, and also reduce splattering of the grease to the outside of the rotary table 1.

In the above embodiment, the lubrication hole 326 is formed in the worm screw housing 32. The lubrication hole 326 has the first opening 326A in the opposing surface 322. The first opening 326A is formed away from the first through hole 323 in the circumferential direction of the worm wheel 21. Providing the lubrication hole 326 enables lubrication in the state where the worm screw housing 32 is fixed to the base body 10. The lubrication is performed, while the worm wheel 21 and the worm screw 31 are rotating, from the upper side of the rotation in the region where the first gear 215 and the second gear 31A are contacting each other. This facilitates lubrication on the region where the first gear 215 and the second gear 31A come into contact.

In the above embodiment, referring to FIGS. 9 and 11, the first opening 326A in the lubrication hole 326 is formed on the first outer wall surface 32A side in the Z axis direction with respect to the region where the first gear 215 and the second gear 31A come into contact. Referring to FIGS. 9 and 11, the first opening 326A is formed slightly on the first outer wall surface 32A side than the center of the opposing surface 322 in the Z axis direction. In the X axis direction, the first opening 326A is formed on the third outer wall surface 32C side with respect to the first through hole 323. Adopting such a configuration allows the grease, while moving by gravity, to be supplied to the region where the first gear 215 and the second gear 31A come into contact. Therefore, the lubrication can be easily performed on the region where the first gear 215 and the second gear 31A come into contact.

In the above embodiment, the rotary table 1 is provided with the cover member 25. Providing the cover member 25 can reduce splattering of the grease to the outside of the rotary table 1.

In the above embodiment, referring to FIGS. 5, 7, and 8, the trajectory of a midpoint $S_1$ in the central axis $P_1$ of a first roller 23 and the trajectory of a midpoint $S_2$ in the central axis $P_2$ of a second roller 24 are included in a virtual plane U. In the present embodiment, the virtual plane U includes the region where the first gear 215 and the second gear 31A come into contact. In the Z axis direction, the position of the center of rotation of the first gear 215 and the position of the center of rotation of the second gear 31A coincide with each other. Arranging the rolling bearing unit 20 and the worm screw unit 30 in this manner facilitates making the contact between the first gear 215 and the second gear 31A optimized for the purpose of efficient transmission of force from the second gear 31A to the first gear 215.

While the case where the pin 33 is arranged on the second outer wall surface 32B of the worm screw housing 32 and the first recess 11 is formed in the base body 10 has been described in the above embodiment, not limited thereto, the pin 33 may be arranged on the second surface 102 of the base body 10 and the first recess 11 may be formed in the second outer wall surface 32B of the worm screw housing.

While the case where the first screw hole 12 into which the hexagon socket set screw 40 is to be screwed is formed in the base body 10 has been described in the above embodiment, not limited thereto, in the case where the pin 33 is arranged so as to protrude from the second surface 102 of the base body 10 and the first recess 11 is formed in the second outer wall surface 32B of the worm screw housing 32, the first screw hole 12 may be formed in the worm screw housing 32. Further, the first screw hole 12 may be formed across the base body 10 and the worm screw housing 32.

The pin 33 in the above embodiment may have a screw hole formed to extend in a direction (Y axis direction) along a plane including the rotational axis R of the worm wheel 21. The base body 10 may have a screw hole formed to extend in the Y axis direction so as to correspond to the position where the above-described screw hole is formed. With the position of the screw hole formed in the pin 33 being aligned with the position of the screw hole formed in the base body 10, a hexagon socket head screw may be screwed in. The hexagon socket head screw may be screwed in such that its head portion comes into contact with the side face of the base body 10. Screwing in the hexagon socket head screw allows the pin 33 to move in the direction of the arrow Y. Adopting such a configuration facilitates adjusting the backlash between the first gear 215 and the second gear 31A with precision.

While the case where the worm wheel 21 is configured as the outer ring in the rolling bearing unit 20 has been described in the above embodiment, not limited thereto, the rolling bearing unit 20 may be configured to include an outer ring separate from the worm wheel 21. The integral configuration of the worm wheel 21 as the outer ring in the rolling bearing unit 20 can reduce the size of the rolling bearing unit 20 and also improve the rigidity of the enclosure.

In the above embodiment, the first rollers 23 and the second rollers 24 are adopted as the rolling elements. The first rollers 23 and the second rollers 24 are arranged alternately in the circumferential direction. The central axis $P_1$ of the first roller 23 intersects the central axis $P_2$ of the second roller 24. Adopting the first rollers 23 and the second rollers 24 makes it possible to configure a rolling bearing suitable for supporting loads applied in a plurality of directions by the worm wheel 21 and the inner ring 22. With such a crossed roller bearing adopted, the rotary table 1 can be configured to be low in profile and compact. The first rollers 23 and the second rollers 24 are inserted after removal of a lid (not shown) of the inner ring 22. While the case of adopting the first rollers 23 and the second rollers 24 as the rolling elements has been described in the above embodiment, not limited thereto, balls may be adopted as the rolling elements. While the case where the worm screw housing 32 includes the flange portion 325 has been described in the above embodiment, not limited thereto, the worm screw housing 32 may include no flange portion 325. While the case where the lubrication hole 326 is formed in the worm screw housing 32 has been described in the above embodiment, not limited thereto, the lubrication hole 326 may not be formed in the worm screw housing 32. Further, either one of the state where the worm screw housing 32 includes the flange portion 325 and the state where the lubrication hole 326 is formed in the worm screw housing 32 may be implemented.

Embodiment 2

A description will now be made of Embodiment 2 of the rotary table 1 of the present disclosure. The rotary table 1 of Embodiment 2 basically has a similar structure and exerts similar effects as the rotary table 1 of Embodiment 1. However, Embodiment 2 differs from Embodiment 1 in that the base body 10 has a block movable in the Y axis direction. The points different from the case of Embodiment 1 will be mainly described below.

Figure 13:
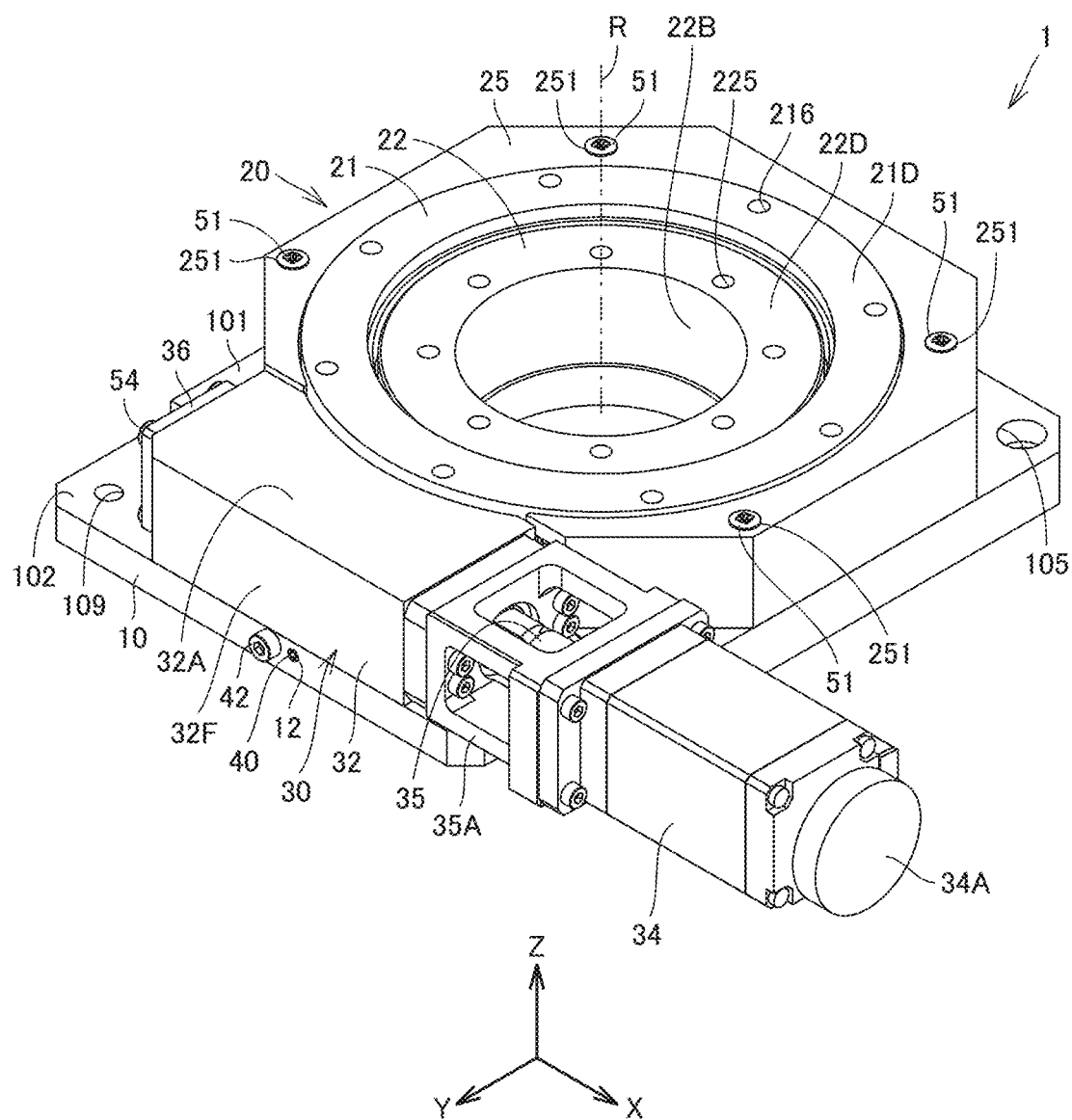
FIG. 13 is a schematic perspective view showing the structure of a rotary table in Embodiment 2.
Figure 14:
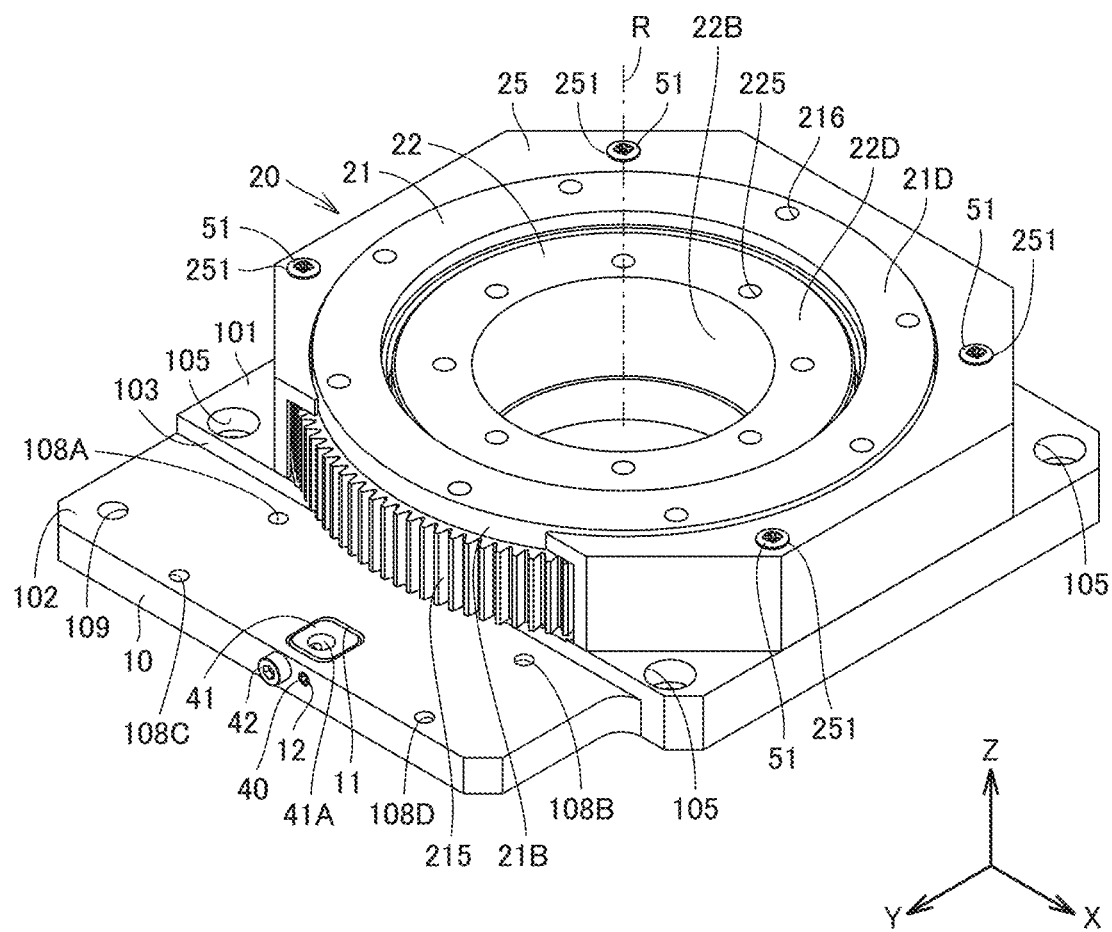
FIG. 14 is a schematic perspective view showing the structure of the rotary table, with the worm screw unit removed therefrom.
Figure 15:
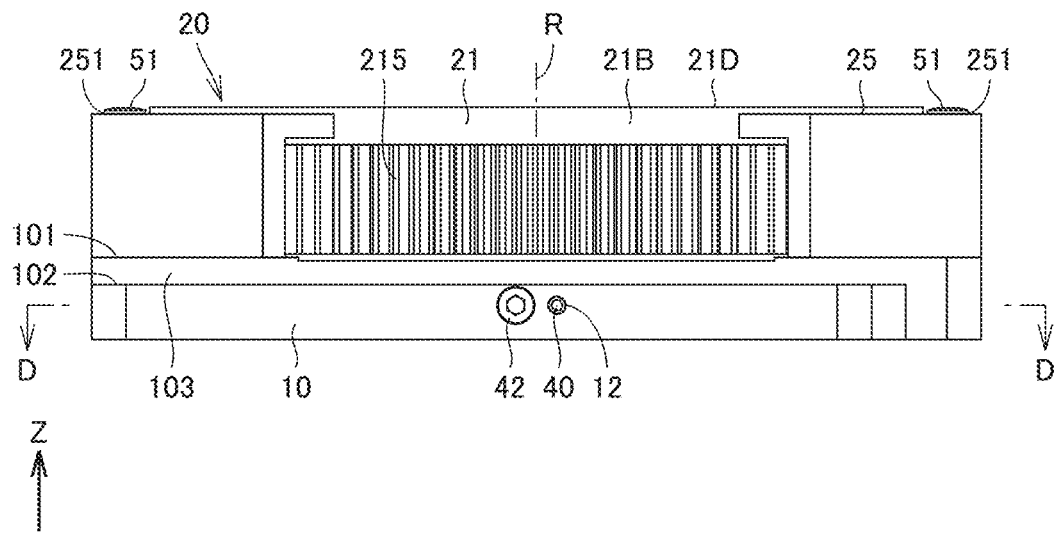
FIG. 15 is a schematic side view showing the structure of the rotary table, with the worm screw unit removed therefrom.
Figure 16:
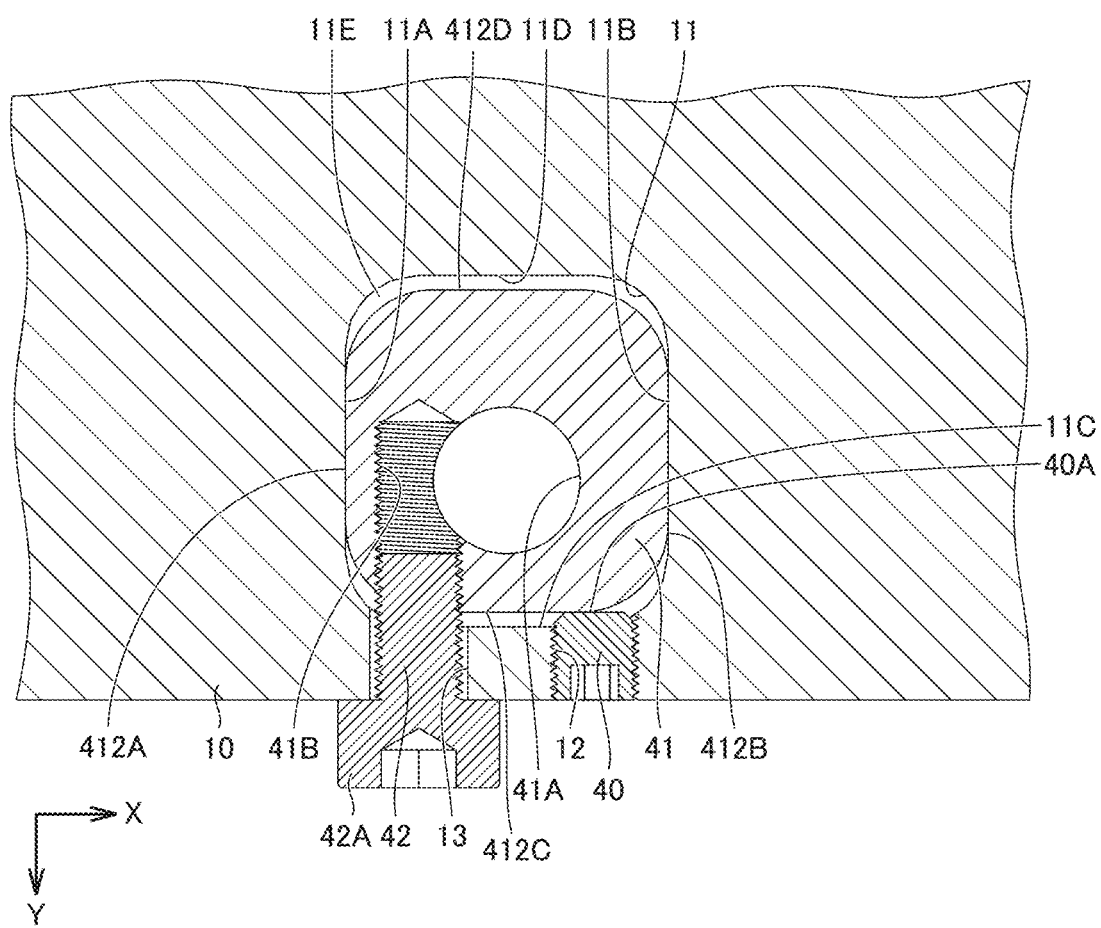
FIG. 16 is a schematic cross-sectional view showing the structure of the rotary table, with the worm screw unit removed therefrom.

FIG. 13 is a schematic perspective view showing the structure of a rotary table in Embodiment 2. FIG. 14 is a perspective view showing the structure of the rotary table with a worm screw unit 30 removed. FIG. 15 is a side view showing the structure of the rotary table with the worm screw unit 30 removed. FIG. 16 is a cross-sectional view showing the structure of the rotary table with the worm screw unit 30 removed. FIG. 16 is a cross-sectional view of the rotary table taken along D-D in FIG. 15.

Referring to FIGS. 13 and 14, the rotary table 1 in Embodiment 2 further includes a block 41 and a hexagon socket head screw 42. Referring to FIGS. 14 and 16, a first recess 11 is formed in the second surface 102 of the base body 10. In the present embodiment, in plan view in the Z axis direction, the first recess 11 has a rectangular shape with rounded corners. The first recess 11 is defined by side wall surfaces 11A, 11B, 11C, 11D, and a bottom wall surface 11E. The side wall surface 11A and the side wall surface 11B oppose each other. The side wall surface 11C and the side wall surface 11D oppose each other. The side wall surface 11A and the side wall surface 11B are parallel to a plane (Y-Z plane) including the rotational axis R of the worm wheel 21. On a side face of the base body 10, a first screw hole 12 and a second screw hole 13 are formed extending along the Y axis direction. The first screw hole 12 and the second screw hole 13 are formed spaced apart from each other in the X axis direction. The first screw hole 12 and the second screw hole 13 are formed in communication with the first recess 11.

Referring to FIG. 16, the block 41 is inserted in the first recess 11 of the base body 10. In the present embodiment, the block 41 has a rectangular parallelepiped shape. In the present embodiment, in plan view in the Z axis direction, the block 41 has a rectangular shape with rounded corners. The block 41 has outer wall surfaces 412A, 412B, 412C, and 412D. The outer wall surface 412A and the outer wall surface 412B are arranged in parallel along the Y axis direction. The outer wall surface 412C and the outer wall surface 412D oppose each other. The outer wall surface 412C and the outer wall surface 412D are apart from each other in the Y axis direction. The block 41 has a cylindrical second recess 41A formed penetrating in the Z axis direction. The second recess 41A has a shape corresponding to the pin 33. On the outer wall surface 412C of the block 41 opposing the side wall surface 11D, a third screw hole 41B is formed extending along the Y axis direction. The block 41 has a width corresponding to the first recess 11. The outer wall surface 412A and the outer wall surface 412B have a length in the X axis direction corresponding to the length in the X axis direction of the side wall surface 11A and the side wall surface 11B. In the present embodiment, the length in the X axis direction of the outer wall surface 412A and the outer wall surface 412B is slightly shorter than the length in the X axis direction of the side wall surface 11A and the side wall surface 11B. The block 41 has a length in the radial direction of the worm wheel 21 shorter than a length of the first recess 11 in the radial direction. In the present embodiment, the length of the outer wall surface 412C and the outer wall surface 412D in the Y axis direction is shorter than the length of the side wall surface 11C and the side wall surface 11D in the Y axis direction. In other words, a small gap allowing movement of the block 41 is formed between the outer wall surface 412A and the side wall surface 11A and between the outer wall surface 412B and the side wall surface 11B. Accordingly, the block 41 is capable of moving in the Y axis direction.

Referring to FIG. 16, a hexagon socket set screw 40 is screwed into the first screw hole 12, and a tip end portion 40A of the hexagon socket set screw 40 comes into contact with the outer circumferential surface 412 of the block 41. The position where the second screw hole 13 is formed in the base body 10 is aligned with the position where the third screw hole 41B is formed in the block 41, and the hexagon socket head screw 42 is screwed in. The hexagon socket head screw 42 has its head portion 42A in contact with the side face of the base body 10.

A description will now be made of the way of fixing the worm screw unit 30 to the base body 10 in the present embodiment. First, a structural body with the rolling bearing unit 20 attached to the base body 10 as shown in FIG. 14 is prepared. Next, as shown in FIG. 13, the worm screw unit 30 is disposed on the base body 10. At this time, the pin 33 protruding from the worm screw housing 32 is press-fitted into the second recess 41A in the block 41. Referring to FIGS. 3, 13, and 14, the screws 53 are inserted into the through holes 108A, 108B, 108C, and 108D, so that the worm screw housing 32 is temporarily fixed to the base body 10. Then, referring to FIGS. 13 and 16, the hexagon socket set screw 40 and the hexagon socket head screw 42 are screwed in. With the hexagon socket head screw 42 being screwed in, the block 41 can be moved in the direction of the arrow Y. With the hexagon socket set screw 40 being screwed in, the block 41 can be moved in the direction opposite to the direction of the arrow Y. That is, screwing in the hexagon socket set screw 40 makes the pin 33 pushed in the direction opposite to the arrow Y, and screwing in the hexagon socket head screw 42 makes the pin 33 pulled in the direction of the arrow Y. After the screw insertion amounts of the hexagon socket set screw 40 and the hexagon socket head screw 42 are adjusted appropriately, the screws 53 are further tightened, whereby the worm screw unit 30 is fixed to the base body 10.

The rotary table 1 of the present disclosure includes the base body 10 having the planar holding surface (second surface 102), the worm wheel 21 disposed on the base body 10 to be rotatable around an axis and having the outer circumferential surface on which the first gear 215 is formed over the entire area in the circumferential direction, the inner ring 22 disposed on the inner circumference side of the worm wheel 21 and fixed to the base body 10, a plurality of rolling elements (first rollers 23 and second rollers 24) arranged to be able to roll on the inner circumferential surface of the worm wheel 21 and the outer circumferential surface of the inner ring 22, and the worm screw unit 30 fixed on the holding surface. The worm screw unit 30 includes the worm screw 31 held to be rotatable around an axis and having the second gear 31A that meshes with the first gear 215, and the worm screw housing 32 surrounding and holding the worm screw 31 and being fixed to contact the holding surface at its planar contacting surface (second outer wall surface 32B). One of the holding surface and the contacting surface has the cylindrical pin 33 protruding therefrom. The other of the holding surface and the contacting surface has the first recess 11 formed therein, the first recess 11 having a pair of side wall surfaces 11A and 11B parallel to a plane (Y-Z plane) including the rotational axis R of the worm wheel 21. In the first recess 11, the block 41 is inserted which has a width corresponding to that of the first recess 11 and a length in the radial direction of the worm wheel 21 shorter than that of the first recess 11. The block 41 has the cylindrical second recess 41A formed to receive the pin 33.

According to the rotary table 1 of Embodiment 2 above as well, the backlash between the first gear 215 and the second gear 31A can be easily adjusted, as in Embodiment 1. Adopting the configuration of the rotary table 1 of Embodiment 2 facilitates adjusting the backlash between the first gear 215 and the second gear 31A with precision.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1: rotary table; 10: base body; 11: first recess; 11A, 11B, 11C, 11D: side wall surface; 11E: bottom wall surface; 12: first screw hole; 13: second screw hole; 20: unit; 21: worm wheel; 21A, 22B: inner circumferential surface; 21B, 22A, 23A, 24A, 33A, 412: outer circumferential surface; 21C, 22C: space; 21D, 21E, 22D, 22E: end face; 22: inner ring; 23: first roller; 24: second roller; 25: cover member; 30: worm screw unit; 31: worm screw; 31A: second gear; 32: worm screw housing; 32A: first outer wall surface; 32B: second outer wall surface; 32C: third outer wall surface; 32D: fourth outer wall surface; 32E: fifth outer wall surface; 32F: sixth outer wall surface; 33: pin; 34: motor; 34A: ring; 35: coupling; 35A: motor housing; 36: lid; 37: first support bearing; 38: second support bearing; 40: hexagon socket set screw; 40A, 325A: tip end portion; 41: block; 41A: second recess; 41B: third screw hole; 42: hexagon socket head screw; 42A: head portion; 51, 52, 53, 54: screw; 101: first surface; 101A, 101B, 321: recess; 102: second surface; 103: third surface; 104, 106, 216, 225, 251, 327: screw hole; 105, 107, 108A, 108B, 108C, 108D, 109: through hole; 211: first region; 212: second region; 213: first rolling surface; 214: second rolling surface; 215: first gear; 215A, 325A: side face; 221: third region; 222: fourth region; 223: third rolling surface; 224: fourth rolling surface; 322: opposing surface; 323: first through hole; 324A, 324B: opening; 325: flange portion; 325B: wall surface; 326: lubrication hole; 326A: first opening; 326B: second opening; 328: grease nipple; and 412A, 412B, 412C, 412D: outer wall surface.

The invention claimed is:
1. A rotary table comprising:
a base body having a planar holding surface;
a worm wheel disposed on the base body to be rotatable around an axis, the worm wheel having an outer circumferential surface with a first gear formed over an entire area in a circumferential direction;
an inner ring disposed on an inner circumference side of the worm wheel and fixed to the base body;
a plurality of rolling elements disposed to be able to roll on an inner circumferential surface of the worm wheel and an outer circumferential surface of the inner ring; and
a worm screw unit fixed on the holding surface;
the worm screw unit including
a worm screw held to be rotatable around an axis, the worm screw having a second gear meshing with the first gear, and
a worm screw housing surrounding and holding the worm screw, the worm screw housing being fixed to contact the holding surface at a planar contacting surface thereof,
one of the holding surface and the contacting surface having a cylindrical pin arranged to protrude therefrom,
the other of the holding surface and the contacting surface having a first recess formed to receive the pin, and being elongated in a radial direction of the worm wheel, and being wider than an outer diameter of the pin,
the pin being movable in the first recess in a radial direction of the worm wheel such that the worm screw housing is movable in the radial direction and rotatable with respect to the base body about a pivot point comprising the pin.
2. The rotary table according to claim 1, wherein at least one of the base body and the worm screw housing has a first screw hole formed in communication with the first recess, the first screw hole having an opening facing an outer circumferential surface of the pin, the rotary table further comprising a first screw screwed into the first screw hole, the first screw having a tip end portion coming into contact with the outer circumferential surface of the pin.

3. The rotary table according to claim 1, wherein
the worm screw housing has an opposing surface that faces the outer circumferential surface of the worm wheel,
the opposing surface has a first through hole formed to expose the second gear, and
the worm screw housing includes a flange portion that protrudes from the opposing surface and covers a side face of the first gear facing the opposing surface that is on an opposite side from the base body in an axial direction of the worm wheel.

4. The rotary table according to claim 3, wherein
the worm screw housing has a lubrication hole formed to penetrate from an outer wall other than the opposing surface to the opposing surface,
the lubrication hole has a first opening on the opposing surface, and
the first opening is formed away from the first through hole in the circumferential direction of the worm wheel.

5. The rotary table according to claim 1, further comprising a cover member surrounding the first gear and being fixed to the base body.

6. The rotary table according to claim 1, wherein
the rolling elements include first rollers and second rollers,
the first rollers and the second rollers are arranged alternately in the circumferential direction of the worm wheel, and
the first rollers have a central axis intersecting a central axis of the second rollers.

7. A rotary table comprising:
a base body having a planar holding surface;
a worm wheel disposed on the base body to be rotatable around an axis, the worm wheel having an outer circumferential surface with a first gear formed over an entire area in a circumferential direction;
an inner ring disposed on an inner circumference side of the worm wheel and fixed to the base body;
a plurality of rolling elements disposed to be able to roll on an inner circumferential surface of the worm wheel and an outer circumferential surface of the inner ring; and
a worm screw unit fixed on the holding surface;
the worm screw unit including
a worm screw held to be rotatable around an axis, the worm screw having a second gear meshing with the first gear, and
a worm screw housing surrounding and holding the worm screw, the worm screw housing being fixed to contact the holding surface at a planar contacting surface thereof,
one of the holding surface and the contacting surface having a cylindrical pin arranged to protrude therefrom,
the other of the holding surface and the contacting surface having a first recess formed to receive the pin, and being elongated in a radial direction of the worm wheel, the pin being movable in the first recess in a radial direction of the worm wheel, and wherein at least one of the base body and the worm screw housing has a first screw hole formed in communication with the first recess, the first screw hole having an opening facing an outer circumferential surface of the pin, the rotary table further comprising a first screw screwed into the first screw hole, the first screw having a tip end portion coming into contact with the outer circumferential surface of the pin.

8. The rotary table according to claim 7, wherein
the worm screw housing has an opposing surface that faces the outer circumferential surface of the worm wheel,
the opposing surface has a first through hole formed to expose the second gear, and
the worm screw housing includes a flange portion that protrudes from the opposing surface and covers a side face of the first gear facing the opposing surface that is on an opposite side from the base body in an axial direction of the worm wheel.

9. The rotary table according to claim 8, wherein
the worm screw housing has a lubrication hole formed to penetrate from an outer wall other than the opposing surface to the opposing surface,
the lubrication hole has a first opening on the opposing surface, and
the first opening is formed away from the first through hole in the circumferential direction of the worm wheel.

10. The rotary table according to claim 7, further comprising a cover member surrounding the first gear and being fixed to the base body.

11. The rotary table according to claim 7, wherein
the rolling elements include first rollers and second rollers,
the first rollers and the second rollers are arranged alternately in the circumferential direction of the worm wheel, and
the first rollers have a central axis intersecting a central axis of the second rollers.

12. A rotary table comprising:
a base body having a planar holding surface;
a worm wheel disposed on the base body to be rotatable around an axis, the worm wheel having an outer circumferential surface with a first gear formed over an entire area in a circumferential direction;
an inner ring disposed on an inner circumference side of the worm wheel and fixed to the base body;
a plurality of rolling elements disposed to be able to roll on an inner circumferential surface of the worm wheel and an outer circumferential surface of the inner ring; and
a worm screw unit fixed on the holding surface;
the worm screw unit including
a worm screw held to be rotatable around an axis, the worm screw having a second gear meshing with the first gear, and
a worm screw housing surrounding and holding the worm screw, the worm screw housing being fixed to contact the holding surface at a planar contacting surface thereof,
one of the holding surface and the contacting surface having a cylindrical pin arranged to protrude therefrom,
the other of the holding surface and the contacting surface having a first recess formed to receive the pin, and being elongated in a radial direction of the worm wheel, the pin being movable in the first recess in a radial direction of the worm wheel, and
wherein the worm screw housing has an opposing surface that faces the outer circumferential surface of the worm wheel, the opposing surface has a first through hole formed to expose the second gear, and the worm screw housing includes a flange portion that protrudes from the opposing surface and covers a side face of the first gear facing the opposing surface that is on an opposite side from the base body in an axial direction of the worm wheel.

13. The rotary table according to claim 12, further comprising a cover member surrounding the first gear and being fixed to the base body.

14. The rotary table according to claim 12, wherein
the rolling elements include first rollers and second rollers,
the first rollers and the second rollers are arranged alternately in the circumferential direction of the worm wheel, and
the first rollers have a central axis intersecting a central axis of the second rollers.

\* \* \* \* \*